UNITED STATES PATENT OFFICE.

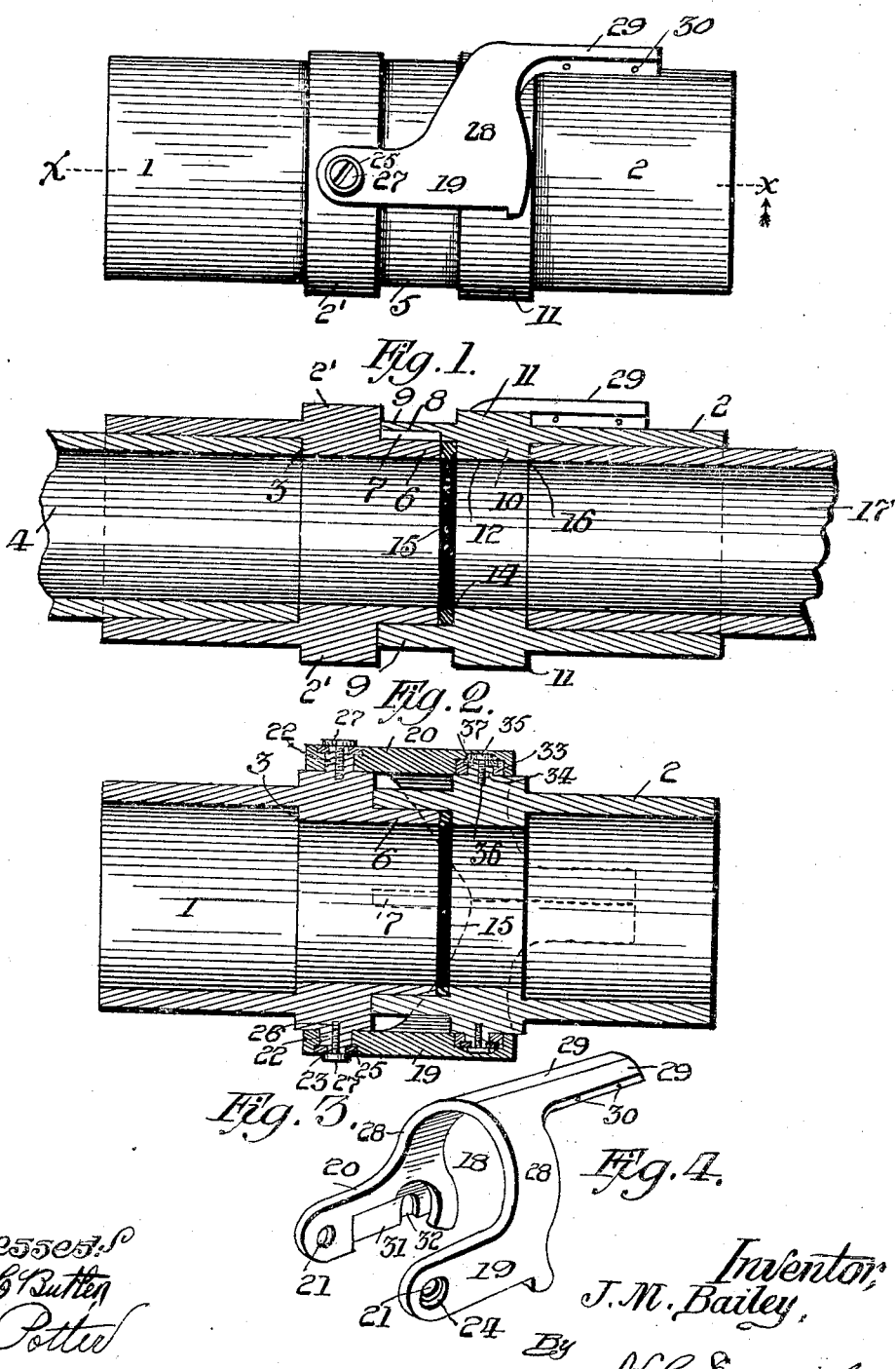

JAMES M. BAILEY, OF WHEELING, WEST VIRGINIA.

HOSE-COUPLING.

No. 835,272.      Specification of Letters Patent.      Patented Nov. 6, 1906.

Application filed March 30, 1904. Serial No. 200,760.

*To all whom it may concern:*

Be it known that I, JAMES M. BAILEY, a citizen of the United States of America, residing at Wheeling, in the county of Ohio and State of West Virginia, have invented certain new and useful Improvements in Hose-Couplers, of which the following is a specification, reference being had therein to the accompanying drawings.

This invention has relation to hose-couplers; and the object of this invention is to provide a hose-coupler which may be secured to two sections of hose and these sections be coupled together in an easy and effectual manner and in a comparatively short period of time.

Another object of my invention is to provide a hose-coupler of this character which will be comparatively inexpensive to manufacture, strong and durable, and highly efficient when used, the two sections of the coupling when once placed together being firmly held and prevented from becoming uncoupled during its use.

Briefly described, my improved hose-coupler comprises two annular members of pipe which are secured one within the other, and on each of these members of pipe a section of hose is secured in any suitable manner. These members comprising the hose-coupler are locked together by a yoke carried by one of the members, this yoke being adapted to span the other member and engage collars carried by said section.

With the above and other objects in view I construct my improvement as hereinafter described and claimed, reference being had to the accompanying drawings, wherein—

Figure 1 is a side elevation of my improved hose-coupler. Fig. 2 is a vertical longitudinal sectional view of the same, showing two sections of hose secured therein. Fig. 3 is a horizontal sectional view taken on the line *x x* of Fig. 1 looking in the direction of the arrow, and Fig. 4 is a detail perspective view of the yoke carried by one of the members of the hose-coupler.

In the accompanying drawings like numerals of reference indicate like parts throughout the several views, and the reference-numeral 1 indicates the male member of the hose-coupler, and reference-numeral 2 indicates the female member of the hose-coupler. The male member of the hose-coupler comprises an annular pipe which has an enlarged annular collar 2' formed upon its one end, this enlarged collar forming an annular shoulder 3 upon the interior of the pipe, and against this shoulder is adapted to rest the end of the hose-section 4, this section being secured in the member 1 by any desired means. The enlarged annular collar 2' is cut away, as indicated at 5, forming an annular projecting sleeve 6, which carries a rib 7, this rib being adapted to fit in a recess 8, formed in the sleeve 9, this sleeve 9 being annular in form and is formed integral with the female member 2 of the hose-coupler. This female member has an enlarged portion 10, which forms an annular collar 11 upon the exterior of the member and an annular collar 12 upon the interior of the member, this collar 12 having a seat 14 upon its one end for a rubber gasket 15, while the other end of said collar forms an annular shoulder 16, against which the hose-section 17 is adapted to rest and be secured in said female member in any suitable manner.

The two members of the hose-coupler are secured together by a yoke 18. This yoke is pivotally mounted upon the male member 1, the arms 19 and 20 of said yoke being provided with apertures 21 21, which are adapted to fit over oppositely-disposed pins 22 22, which are formed integral with the annular collar 2 of the member 1. These pins 22 22 have contracted ends 23, which form annular shoulders, and the apertures 21 21 are cut away upon the outer sides of the arms 19 and 20 to form annular recesses 24, and in said recesses and upon the contracted ends 23 of the pins 22 are placed washers 25, and the arms of the yoke and the washers are held upon said pins by a screw 26, having an enlarged head 27. This yoke 18 is made in two sections, whereby the yoke may be placed upon the male member 1, and after the arms are placed upon the pins 22 of the male member 1 the two sections of the yoke are riveted together, and the reference-numeral 28 indicates the curved portions of the sections of the yoke 18, and the reference-numerals 29 29 indicate two rearwardly-extending projections which are secured together by rivets 30, these projections forming a lever whereby the yoke is operated. The arms 19 and 20 upon their inner faces are recessed, as indicated at 31, and the rear wall of this recess is again recessed, as indicated at 32, these recesses being adapted to engage over rollers 33, rotatably mounted upon pins 34, carried by the annular collar 11 of the member 2. These rollers 33 are secured upon these pins in a similar manner to that construction by which the arms 19 and 20 of the yoke are secured upon the pins 22 22 of the male member, the recess 32 being provided to engage over the screw-heads 35 of the screws 36, which are employed to hold the washers 37 and rollers 33 upon the pins 34.

The operation of my improved hose-coupler is as follows: It being desired to connect the two members of the coupling together, the annular sleeve 6 is placed within the sleeve 9, the end of the sleeve 6 abutting against the rubber gasket 15, and the pins 22 22 of the male member 1 are alined with the pins 34 34 of the female member 2 by placing the rib 7 of the sleeve 6 within the recess 8 of the sleeve 9, at which time the yoke is forced down from the female member, the yoke being hinged upon the pins 22 22, and the recess 31 of the arms 19 and 20 of this yoke will engage over the rollers 33 33, carried by the pins 34 of the female member, and securely hold the two members of the coupling together.

It will be noted that I may make various changes in the details of construction without departing from the general spirit and scope of my invention.

What I claim, and desire to secure by Letters Patent, is—

In a hose-coupling, the combination of a male member, an integral collar of greater diameter than the body of the member, a shoulder formed on the interior of the body portion, said shoulder adapted to receive the ends of a hose, said collar being cut away and forming a projecting sleeve 6, a key 7 carried by said projecting sleeve 6, a yoke pivotally mounted on the collar of said male member, a female member having an integral collar of greater diameter than the body of the member, a shoulder formed on the interior of the body of said female member adapted to receive the end of a hose, a projecting sleeve 9 adapted to surround the projecting sleeve 6 of the male member, said projecting sleeve being provided with a recess adapted to engage with the key 7 on the projecting sleeve of the male member, and pins mounted on the collar of said member, said pins being adapted to be engaged by a yoke, substantially as described.

In testimony whereof I affix my signature in the presence of two witnesses.

JAMES M. BAILEY.

Witnesses:
SAMUEL B. MARSHALL,
WILLIAM H. LONG.